United States Patent
Sharp

(10) Patent No.: US 7,926,504 B2
(45) Date of Patent: Apr. 19, 2011

(54) METHOD AND SYSTEMS FOR DETECTING AND PREVENTING LEAKAGE

(75) Inventor: Terry D. Sharp, Harrisburg, IL (US)

(73) Assignee: Sharp Technologies, Inc., Harrisburg, IL (US)

( * ) Notice: Subject to any disclaimer, the term of this patent is extended or adjusted under 35 U.S.C. 154(b) by 227 days.

(21) Appl. No.: 12/357,085

(22) Filed: Jan. 21, 2009

(65) Prior Publication Data
US 2010/0180956 A1 Jul. 22, 2010

(51) Int. Cl.
F16K 51/00 (2006.01)
G08B 21/00 (2006.01)
(52) U.S. Cl. ............. 137/15.11; 137/312; 340/605
(58) Field of Classification Search .......... 137/312, 137/15.11, 15.18; 340/605, 604
See application file for complete search history.

(56) References Cited

U.S. PATENT DOCUMENTS

| 6,229,229 | B1 | 5/2001 | Sharp |
| 6,489,895 | B1 | 12/2002 | Apelman |
| 6,675,826 | B1 | 1/2004 | Newman et al. |
| 6,950,032 | B1 * | 9/2005 | Hewitt et al. ............... 137/312 |
| D511,703 | S | 11/2005 | Moyer |
| 7,044,154 | B2 | 5/2006 | Henderson et al. |
| 7,082,959 | B1 | 8/2006 | Franklin |
| 7,218,237 | B2 | 5/2007 | Kates |
| 2001/0003286 | A1 | 6/2001 | Philippbar et al. |
| 2007/0181186 | A1 | 8/2007 | Walter |
| 2007/0211076 | A1 | 9/2007 | Kates |

* cited by examiner

*Primary Examiner* — Kevin L Lee
(74) *Attorney, Agent, or Firm* — Armstrong Teasdale LLP

(57) ABSTRACT

A valve assembly for use in detecting leaks is provided. The valve assembly includes a valve, a power source coupled to the valve, and a sensor coupled to the power source. The sensor is configured to close the valve when exposed to a predetermined amount of fluid.

18 Claims, 2 Drawing Sheets

METHOD AND SYSTEMS FOR DETECTING AND PREVENTING LEAKAGE

BACKGROUND OF THE INVENTION

The field of the invention relates generally to early leak detection systems, and more particularly to methods and systems for detecting leaks and disabling a source of fluid.

Although many known fluid lines used to supply a fluid to an appliance, such as a toilet, include a manual shut-off valve, often leaks occur without being immediately observed. Leakage from a fluid supply line may cause damage to the surrounding area prior to a person observing such a leak and operating the manual shut-off valve to stop the flow of fluid past the valve.

To facilitate reducing the possible effects of undetected leakage, at least some known appliances include a fluid leak detection system. Most of such known detection systems require the use of an electronic means for sensing the presence of fluids. Furthermore, at least some known detection systems require the conductivity of the water to be measured, prior to a solenoid or other such device being energized to shut an associated water valve. However, if a fluid leak occurs during an electrical power outage, such systems may fail to control fluid flow, unless auxiliary power is supplied. In addition, because at least some known fluid leak detection systems require numerous parts, such systems may be relatively expensive, may be difficult to manufacture, install, and/or service, and/or may be difficult to tailor to specific applications.

BRIEF DESCRIPTION OF THE INVENTION

In one aspect, a valve assembly for use in detecting leaks is provided. The valve assembly includes a valve, a power source coupled to the valve, and a sensor coupled to the power source. The sensor is configured to close the valve when exposed to a predetermined amount of fluid.

In another aspect, a kit for use in detecting leaks is provided. The kit includes a housing and a valve assembly housed within a cavity defined in the housing. The valve assembly includes a valve, a power source coupled to the valve, and a sensor coupled to the power source. The sensor is configured to close the valve when exposed to a predetermined amount of fluid.

In a further aspect, a method of assembling a valve assembly for use in detecting leaks is provided. The method includes providing a valve, coupling a power source to the valve, and coupling a sensor to the power source such that the sensor is configured to close the valve when exposed to a predetermined amount of fluid.

DETAILED DESCRIPTION OF THE INVENTION

Figure 1:
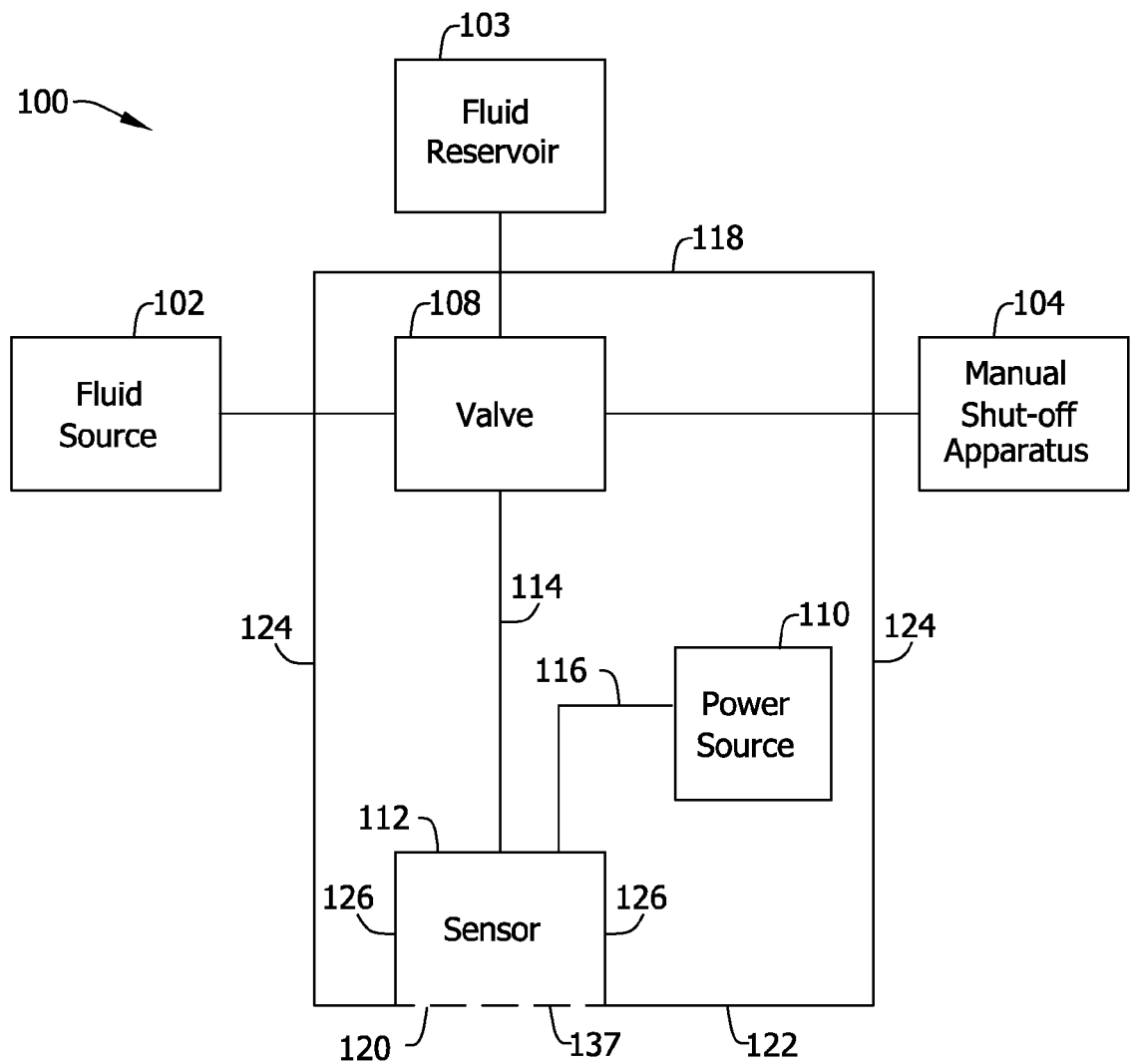
FIG. 1 is a schematic view of an exemplary leak detection system.

FIG. 1 is a schematic view of an exemplary leak detection system 100 that may be used to detect leakage from a fluid system 101, such as, but not limited to, toilets, washing machines, and other appliances. In the exemplary embodiment, fluid system 101 includes a fluid source 102 and a fluid flow reservoir 103, such as a toilet. In the exemplary embodiment, system 100 includes a manual shut-off apparatus 104, and a valve assembly 106. Valve assembly 106, in the exemplary embodiment, is coupled between a fluid source 102 of the fluid system 101 and manual shut-off apparatus 104. In an alternative embodiment, valve assembly 106 may be coupled downstream from manual shut-off apparatus 104.

In the exemplary embodiment, valve assembly 106 includes a valve 108, a power source 110, and a sensor 112. Valve 108 is coupled to sensor 112 via a first terminal 114, and power source 110 is coupled to sensor 112 via a second terminal 116. In the exemplary embodiment, valve assembly 106 is positioned within a housing 118. Power source 110, in the exemplary embodiment, may be any power source capable of supplying a sufficient electrical current to valve 108 upon the detection of a predetermined amount of fluid by sensor 112. In the exemplary embodiment, power source 110 is a battery. In an alternative embodiment, power source may include any source of power capable of providing an electrical current to valve 108 as is described herein. Moreover, valve assembly 106 may include a back-up power source (not shown). Housing 118, in the exemplary embodiment, is fabricated from a light-weight plastic. In an alternative embodiment, housing 118 may be fabricated from any suitable material that enables system 100 to function as described herein.

As described in more detail below, housing 118 is formed with an opening 120 on a bottom 122 thereof. Opening 120 provides access to internal components of sensor 112 contained within housing 118. Moreover, in the exemplary embodiment, sides 124 of housing 118, as well as side portions 126 of sensor 112, are oriented to facilitate preventing internal components such as valve 108, power source 110, and sensor 112 contained within housing 118 from being exposed to fluid from a splash occurring in a vicinity of sensor 112. Rather, as described in more detail below, housing 118 is designed to ensure that the internal components within housing 118 are only exposed to fluid entering housing 118 through bottom opening 120. Moreover, in alternative embodiments, system 100 may include multiple sensors positioned to detect fluid leaks or fluid accumulation in multiple locations.

Valve 108 may be any type of valve that is capable of operating in accordance with valve assembly 106 as described herein. Moreover, in the exemplary embodiment, and as is described in more detail below, valve 108 maintains valve 108 in a closed position after activation of sensor 112. For example, valve 108 may be magnetically, electrically, or mechanically biased to a closed position. In addition, in the exemplary embodiment, valve 108 includes a manual reset 129 that enables valve 108 to be manually reset to an open position after sensor 112 has detected a liquid. For example, manual reset 129 may be a button, switch, or lever (none shown) that enables valve 108 to be reset to an open position upon activation by a user.

Figure 2:
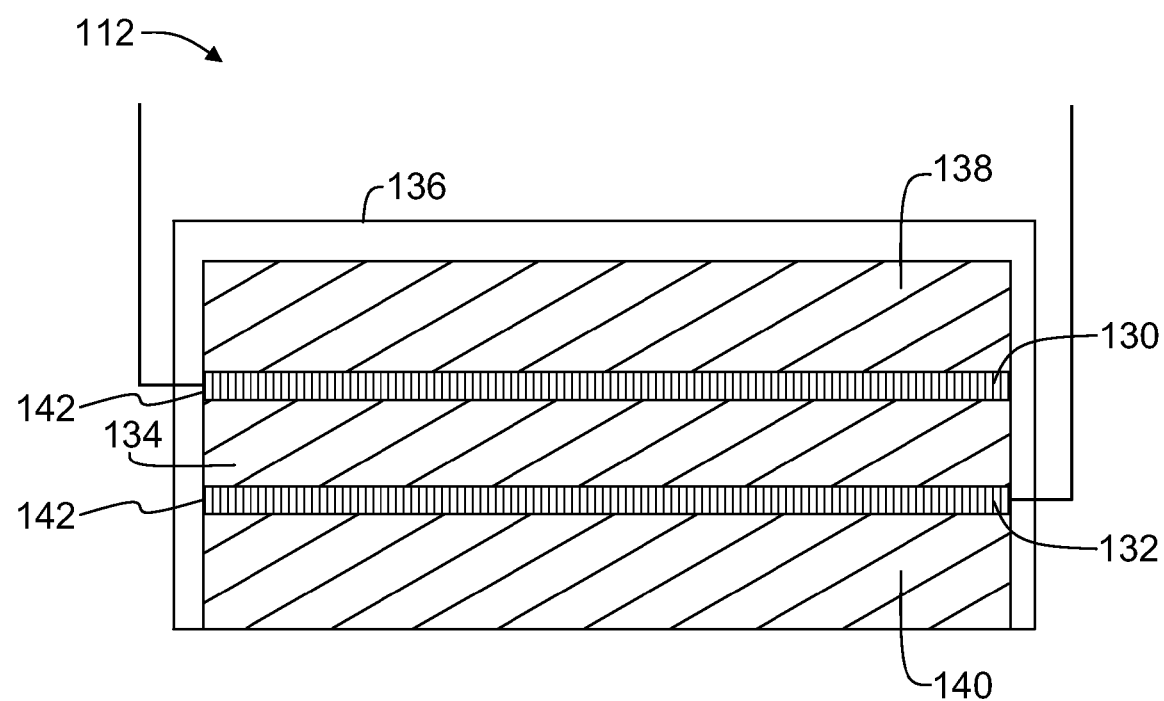
FIG. 2 is a schematic view of an exemplary sensor that may be used with the leak detection system shown in FIG. 1.

FIG. 2 is a schematic view of sensor 112. As described above, sensor 112 may be used in system 100. In the exemplary embodiment, sensor 112 includes an upper conductor 130 and a lower conductor 132 that are separated by a permeable insulating material 134. Upper and lower conductors 130 and 132, respectively, as well as fluid permeable insulating material 134 are housed within, and generally shielded from the surrounding environment by a sensor housing 136. In the exemplary embodiment, a bottom portion 137 of sensor housing 136 is formed with an opening (not shown) that enables fluid to contact fluid permeable insulating material 134 as described in more detail below.

Upper conductor 130 is electrically coupled to valve 108 via first terminal 114, and lower conductor 132 is electrically coupled to power source 110 via second terminal 116. As is described in more detail below, sensor 112 is designed to be activated only when exposed to a predetermined amount of fluid such that a fluid is present within sensor housing 136. It should be noted that if permeable insulating material 134 has a tendency to lift or "wick" liquids upwardly, the fluid level $L_s$ required to activate sensor 112 may be lower than fluid level $L_s$, as illustrated in FIG. 2.

In the exemplary embodiment, upper and lower conductors 130 and 132, respectively, are each fabricated with a conductive mesh material, and fluid permeable insulating material 134 is fabricated with a foam layer. Moreover, in the exemplary embodiment, sensor 112 is fabricated with an upper layer of non-conductive foam 138 to facilitate preventing any objects that fall onto upper conductor 130 from inadvertently electrically coupling (i.e., shorting) to other objects. In the exemplary embodiment, sensor 112 also includes a bottom layer of non-conductive foam 140 to elevate lower conductor 132 from bottom portion 137 of sensor housing 136. In an alternative embodiment, sensor 112 does not include bottom layer of non-conductive foam 140 such that lower conductor 132 forms a lowest surface of sensor 112 along bottom portion 137. In the exemplary embodiment, bottom layer of non-conductive foam 140, top layer of non-conductive foam 138, and permeable insulating material 134 are generally non-conductive when dry. However, because at least insulating material 134 is fluid permeable, insulating material 134 is electrically conductive when permeated with water or any other conductive fluid.

Sensor 112 is fabricated to insure it is activated when permeated with a fluid level $L_s$. For example, if sensor 112 is designed to be activated when saturated with a detected fluid level of about 0.2 inches, upper conductor 130 is positioned approximately 0.2 inches above sensor bottom 137. However, if insulating material 134 has wicking properties, then upper conductor 130 may be positioned at a higher elevation relative to sensor bottom 137, or at a location to which insulating material 134 wicks fluid when sensor 112 is saturated with approximately 0.2 inches of fluid. Moreover, sensor 112 may be configured to activate as soon as sensor 112 is exposed to a minimal amount of fluid. In such an embodiment, bottom layer of non-conductive foam 140 is omitted and lower conductor 132 and/or insulating material 134 are constructed with a thickness that enables upper conductor 130 to be positioned in close proximity and/or against sensor bottom 137. In an alternative embodiment, sensor 112 may be rotated 90° from the position illustrated in FIG. 2 such that ends 142 of upper and lower conductors 130 and 132, respectively, form a portion of, or are against sensor bottom 137.

During use, in the exemplary embodiment, housing 118, containing valve 108, sensor 112, and power source 110, is positioned such that valve 108 is coupled between fluid source 102 and manual shut-off apparatus 104. Moreover, in the exemplary embodiment, sensor 112 is positioned near a floor (not shown) or other supporting surface and at a predetermined height above the floor. When a leak develops and fluid begins to accumulate, a fluid level of fluid in proximity to sensor 112 increases. When fluid rises to at least level $L_s$, fluid enters housing 118 and permeates insulating material 134. Once saturated, upper and lower conductors 130 and 132, respectively, become electrically coupled causing an electrical charge from power source 110 to be supplied to valve 108. The charge causes valve 108 to move to a closed position, thus preventing fluid from exiting fluid source 102 through valve 108. Moreover, once in the closed position valve 108 is maintained via biasing in the closed position without the use of power source 110 until valve 108 is either replaced and/or the manual reset means (not shown) is activated.

The above-described methods and systems for detecting and preventing leaks are cost-effective and highly reliable. The detection system facilitates an early detection and prevention of a fluid leak without the activation of the manual shut-off apparatus by a user. In addition, once activated, the valve is maintained valve in a closed position, such that fluid is prevented from flowing from the fluid source through the valve. As a result, the useful life of the power source is facilitated to be extended, as the power source is only required to close the valve and is not used in maintaining the valve in a closed position. Side walls of the sensor facilitate preventing the inadvertent activation of the sensor, and the unnecessarily closing of the valve, such as when a fluid splash occurs in the vicinity of the valve apparatus. The valve manual reset enables the valve apparatus to be reused without having to purchase additional parts. Accordingly, the methods and systems described herein facilitate the early detection and prevention of leaks in a cost-effective and reliable manner.

Exemplary embodiments of methods and systems for detecting and preventing leaks are described above in detail. The methods and systems are not limited to the specific embodiments described herein nor to the specific illustrated systems, but rather, steps of the method and/or components of the systems may be utilized independently and separately from other steps and/or components described herein. Further, the described method steps and/or system components can also be defined in, or used in combination with, other methods and/or systems, and are not limited to practice with only the method and system described herein. The description is meant to cover a specific example of the general process for detecting and preventing leaks and should not be found limited to the specific embodiment described.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A valve assembly for use in detecting leaks, said valve assembly comprising:
    a housing comprising a generally impermeable top surface and an opposite bottom surface comprising an opening extending therethrough, wherein said top and bottom surfaces at least partially define a cavity within said housing;
    a valve;
    a power source coupled to said valve; and
    a sensor coupled to said power source, said sensor positioned within the cavity underneath said top surface, said sensor configured to close said valve when exposed to a predetermined amount of fluid channeled through said bottom surface opening.

2. A valve assembly in accordance with claim 1, wherein said sensor comprises a conductor and a permeable material positioned adjacent to said conductor, said permeable material is electrically conductive when permeated with a fluid.

3. A valve assembly in accordance with claim 2, wherein said conductor is electrically coupled to at least one of said valve and said power source.

4. A valve assembly in accordance with claim 1, wherein said valve is maintained in a closed position after said sensor has been exposed to a predetermined amount of fluid.

5. A valve assembly in accordance with claim 1, wherein said valve comprises a manual reset for use in resetting said valve to an open position after said sensor has been exposed to a pre-determined amount of fluid.

6. A valve assembly in accordance with claim 1, wherein said power source is a battery.

7. A kit for use in detecting leaks, said kit comprising:
a housing comprising a generally impermeable top surface and an opposite bottom surface comprising an opening extending therethrough, wherein said top and bottom surfaces at least partially define a cavity within said housing; and
a valve assembly housed within the cavity underneath said top surface, said valve assembly comprises a valve, a power source coupled to said valve, and a sensor coupled to said power source, said sensor configured to close said valve when exposed to a pre-determined amount of fluid channeled through said bottom surface opening.

8. A kit in accordance with claim 7, wherein said sensor comprises a conductor and a permeable material positioned adjacent to said conductor, said permeable material is electrically conductive when permeated with a fluid.

9. A kit in accordance with claim 8, wherein said conductor is electrically coupled to at least one of said valve and said power source.

10. A kit in accordance with claim 7, wherein said valve is maintained in a closed position after said sensor has been exposed to a predetermined amount of fluid.

11. A kit in accordance with claim 7, wherein said valve comprises a manual reset for use in resetting said valve to an open position after said sensor has been exposed to a predetermined amount of fluid.

12. A kit in accordance with claim 7, wherein said power source is a battery.

13. A kit in accordance with claim 7, wherein said kit further comprises a second sensor.

14. A kit in accordance with claim 7, wherein said kit further comprises means for coupling said kit between a fluid source and a manual shut-off apparatus.

15. A method of assembling a valve assembly for use in detecting leaks comprising:
providing a valve;
coupling a power source to the valve;
positioning a sensor within a cavity defined by a housing that includes at least a generally impermeable top surface and an opposite bottom surface including an opening extending therethrough; and
coupling the sensor to the power source such that the sensor is configured to close the valve when exposed to a pre-determined amount of fluid channeled through the bottom surface opening.

16. A method in accordance with claim 15, wherein the method further comprises coupling a manual reset to the valve, said manual reset for use in resetting the valve to an open position after the sensor has been exposed to a predetermined amount of fluid.

17. A method in accordance with claim 15, wherein coupling the sensor to the valve and the power source comprises coupling an upper conductor of the sensor to a battery and coupling a lower conductor of the sensor to the valve.

18. A method in accordance with claim 15 further comprising coupling the valve assembly between a fluid supply line and a manual shut-off assembly.

* * * * *